US007025925B2

(12) United States Patent
Pecorini et al.

(10) Patent No.: US 7,025,925 B2
(45) Date of Patent: Apr. 11, 2006

(54) EXTRUSION BLOW MOLDED ARTICLES

(75) Inventors: Thomas Joseph Pecorini, Kingsport, TN (US); Sam Richard Turner, Kingsport, TN (US); Gary Wayne Connell, Church Hill, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/812,203

(22) Filed: Mar. 29, 2004

(65) Prior Publication Data

US 2004/0180166 A1 Sep. 16, 2004

Related U.S. Application Data

(63) Continuation-in-part of application No. 10/357,119, filed on Feb. 3, 2003, now abandoned.

(51) Int. Cl.
 B29C 49/04 (2006.01)
 B65D 1/00 (2006.01)
(52) U.S. Cl. .................................. 264/540; 428/35.7
(58) Field of Classification Search ................ 264/540; 428/35.7
 See application file for complete search history.

(56) References Cited

U.S. PATENT DOCUMENTS

| 2,901,466 | A | 8/1959 | Kibler et al. |
|---|---|---|---|
| 3,592,875 | A | 7/1971 | Brinkmann et al. |
| 3,592,876 | A | 7/1971 | Brinkmann et al. |
| 4,025,492 | A | 5/1977 | Binsack et al. |
| 4,064,112 | A | 12/1977 | Rothe et al. |
| 4,093,603 | A | 6/1978 | Jackson, Jr. et al. |
| 4,136,089 | A | 1/1979 | Bier et al. |
| 4,161,579 | A | 7/1979 | Edelman et al. |
| 4,176,224 | A | 11/1979 | Bier et al. |
| 4,182,841 | A | 1/1980 | Hauenstein |
| 4,208,527 | A | 6/1980 | Horlbeck et al. |
| 4,219,527 | A | 8/1980 | Edelman et al. |
| 4,234,708 | A | 11/1980 | Edelman et al. |
| 4,238,593 | A | 12/1980 | Duh |
| 4,398,022 | A | 8/1983 | Sublett |
| 4,471,108 | A | 9/1984 | Belder et al. |
| 4,520,188 | A | 5/1985 | Holzrichter et al. |
| 4,551,403 | A | 11/1985 | Miyakawa et al. |
| 4,983,711 | A | 1/1991 | Sublett et al. |
| 5,145,742 | A | 9/1992 | Yau |
| 5,235,027 | A | 8/1993 | Thiele et al. |
| 5,376,735 | A | 12/1994 | Sublett |
| 5,442,036 | A | 8/1995 | Beavers et al. |
| 5,523,382 | A | 6/1996 | Beavers et al. |
| 5,656,715 | A | 8/1997 | Dickerson et al. |
| 5,681,918 | A | 10/1997 | Adams et al. |
| 5,849,846 | A | 12/1998 | Cheng et al. |
| 6,183,848 | B1 | 2/2001 | Turner et al. |
| 6,380,279 | B1 | 4/2002 | Moens et al. |

FOREIGN PATENT DOCUMENTS

| EP | 411136 A1 | 2/1991 |
|---|---|---|
| EP | 781565 | 7/1997 |
| JP | 3225982 B2 | 11/2001 |

OTHER PUBLICATIONS

U.S. Appl. No. 10/808,070, Turner et al.
R. E. Wilfong, Journal of Polymer Science, 54, 1961, pp. 385-410.
F. W. Billmeyer, *Textbook of Polymer Science*, John Wiley & Sons, (1971), p. 84.
Notice of Allowance dated Jan. 30, 2004 from U.S. Appl. No. 10/195,267.

*Primary Examiner*—Suzanne E. McDowell
(74) *Attorney, Agent, or Firm*—Bernard J. Graves, Jr.; Eric D. Middlemas

(57) ABSTRACT

Disclosed is a process for the manufacture of shaped articles by extrusion blow molding comprising the steps of (1) extruding a copolyester through a die to form a tube of molten copolyester; (2) positioning a mold having the desired finished shape around the tube of molten copolyester; and (3) introducing a gas into the tube of molten copolyester, causing the extrudate to stretch and expand to fill the mold; wherein the copolyester is a linear, copolyester having an inherent viscosity (IV) of at least about 0.7 dL/g measured at a temperature of 25° C. at 0.5 g/dL concentration in a solvent mixture of symmetric tetrachloroethane and phenol having a weight ratio of symmetric tetrachloroethane to phenol of 2:3 and comprising:
(1) a diacid component consisting essentially of 90 to 100 mole percent terephthalic acid residues and 0 to about 10 mole percent isophthalic acid residues, naphthalenedicarboxylic acid residues, biphenyldicarboxylic acid residues or a combination of 2 or more of isophthalic, naphthalenedicarboxylic or bipheyldicarboxylic acid residues; and
(2) a diol component consisting essentially of about 70 to 90 mole percent 1,4-cyclohexanedimethanol residues and about 30 to 10 mole percent neopentyl glycol residues;
wherein the copolyester comprises 100 mole percent diacid component and 100 mole percent diol component. The process is particularly useful for the manufacture of bottles or carboys having and interior volume of about 2 to 50 liters.

12 Claims, No Drawings

EXTRUSION BLOW MOLDED ARTICLES

CROSS REFERENCE TO RELATED APPLICATIONS

This application is a continuation-in-part of application Ser. No. 10/357,119, filed Feb. 3, 2003 now abandoned.

FIELD OF THE INVENTION

This invention relates to shaped articles produced by extrusion blow molding of linear copolyesters containing 1,4-cyclohexanedimethanol and neopentyl glycol residues. More particularly, this invention relates shaped articles such as containers produced by extrusion blow molding of a crystallizable copolyester containing 1,4-cyclohexanedimethanol and neopentyl glycol residues that exhibit improved shear thinning behavior.

BACKGROUND OF THE INVENTION

Extrusion blow molding is a common process for creating hollow articles from polymeric materials. A typical extrusion blow-molding manufacturing process involves: 1) melting the resin in an extruder; 2) extruding the molten resin through a die to form a tube of molten polymer (i.e. a parison) having a uniform side wall thickness; 3) clamping a mold having the desired finished shape around the parison; 4) blowing air into the parison, causing the extrudate to stretch and expand to fill the mold; 5) cooling the molded article; and 6) ejecting the article of the mold.

In order to form good quality containers that have uniform side wall thickness and to prevent tearing of the parison during expansion (i.e. blowing), the polymer extrudate must have good molten dimensional stability, also known as melt strength. A material having good molten dimensional stability (i.e. high melt strength) has a tendency to resist stretching and flowing as a result of gravitational force when in the softened or molten state. Excessive stretching of the extrudate parison causes the walls to become too thin. This leads to lack of uniformity in the wall thickness. Thin walls also have a greater tendency to tear under the influence of the air pressure being used to expand the extrudate into the mold walls.

In extrusion blow molding, the polymer melt usually is extruded vertically from a die into a parison, whereby melt strength can be determined by measuring the vertical length of an extrudate after a certain amount of time to determine the extent to which the extrudate stretches or "sags". When measuring sag, the extruder output and die gaps are fixed, whereby a given volume and weight of material is extruded over a fixed length of time. Given these conditions, the extrudate of a polymer with low melt strength will be long and thin. In contrast, the extrudate of a polymer with high melt strength will be short and thick. In addition, the sag of the extruded parison is directly related to the weight of the parison, whereby larger and heavier parisons will have a greater tendency to sag. Therefore, higher melt strength materials are required to allow larger and heavier parisons, e.g., for making larger bottles, and to maintain their shape. The higher the melt strength, the larger the bottle that can be produced.

Since melt strength is related to slow flow induced primarily by gravity, it can be related to viscosity of a polymer measured at a low shear rate, such as 1 radian/second. Viscosity can be measured by typical viscometers, such as a parallel plate viscometer. Typically, viscosity is measured at the typical processing temperature for the polymer, and is measured at a series of shear rates, often between 1 radian/second and 100 radian/second. In extrusion blow molding, the viscosity at 1 radian/second at processing temperatures typically needs to be above 30,000 poise in order to blow a bottle. Larger parisons require higher viscosities.

Melt strength, however, only defines one of the processing characteristics important in extrusion blow molding. The second important characteristic is ease of flow at high shear rates. The polymer is "melt processed" at shear rates ranging anywhere from about $10\ s^{-1}$ to $1000\ s^{-1}$ in the die/extruder. A typical shear rate encountered in the barrel or die during extrusion blow molding or profile extrusion is 100 radians/second. These high shear rates are encountered as the polymer flows down the extruder screw, or as it passes through the die. These high shear rates are required to maintain reasonably fast production rates. Unfortunately, high melt viscosity at high shear rates can lead to viscous dissipation of heat, in a process referred to as shear heating. Shear heating raises the temperature of the polymer and the extent of temperature rise is directly proportional to the viscosity at that shear rate. Since viscosity decreases with increasing temperature, shear heating decreases the low shear rate viscosity of the polymer and thus its melt strength decreases.

Furthermore, a high viscosity at high shear rates, (for example as found in the die) can create a condition known as melt fracture or "sharkskin" on the surface of the extruded part or article. Melt fracture is a flow instability phenomenon occurring during extrusion of thermoplastic polymers at the fabrication surface/polymer melt boundary. The occurrence of melt fracture produces severe surface irregularities in the extrudate as it emerges from the orifice. The naked eye detects this surface roughness in the melt-fractured sample as a frosty appearance or matte finish as opposed to an extrudate without melt fracture that appears clear. Melt fracture occurs whenever the wall shear stress in the die exceeds a certain value, typically 0.1 to 0.2 MPa. The wall shear stress is directly related to the volume throughput or line speed (which dictates the shear rate) and the viscosity of the polymer melt. By reducing either the line speed or the viscosity at high shear rates, the wall shear stress is reduced lowering the possibility for melt fracture to occur. Although the exact shear rate at the die wall is a function of the extruder output and the geometry and finish of the tooling, a typical shear rate that is associated with the onset of melt fracture is 100 radian/sec. Likewise, the viscosity at this shear rate typically needs to be below 30,000 poise.

To couple all of these desired properties, the ideal extrusion blow molding polymer, from a processability standpoint, will possess a high viscosity at low shear rates in conjunction with a low viscosity at high shear rates. These attributes are also useful in other melt processes. For injection molding, the low viscosity at high shear rates will allow the polymer to easily flow into the mold. However, once flow has stopped and the shearing removed, the polymer rapidly becomes highly viscous so that the part can be quickly removed from the mold. For profile extrusion, a high viscosity at low shear rates maximizes melt strength while low viscosity at high shear rates minimizes screw motor load, pumping pressure, shear heating and melt fracture.

Fortunately, most polymers naturally exhibit at least some degree of viscosity reduction between low and high shear rates, known as "shear thinning", which aids in their processability. Without the shear thinning, an extruder running a high melt viscosity polymer would require extremely high motor loads and/or very high melt temperatures, both of which can lead to polymer degradation and excessive energy consumption. The ideal polymer noted above would possess a high degree of shear thinning. Based on the preceding discussion, one definition of shear thinning important to the processes discussed in this invention would be the ratio of the viscosity measured at 1 radian/second to the viscosity measured at 100 radians/second. These viscosities would both be measured at the same temperature, typical of the actual processing conditions. This definition will be used to describe shear thinning for the purposes of this invention.

Unfortunately, certain polymers such as polycarbonates and polyesters such as poly(ethylene terephthalate) (PET) and poly(ethylene-co-1,4-cyclohexylene-dimethylene terephthalate) (PETG) have a very low degree of shear thinning as compared to polymers like PVC, polystyrene, acrylics and polyolefins. Since these other polymers suffer from one or more of their own disadvantages (e.g. cost, odor, clarity, toughness, chemical resistance), polyesters would be ideal alternative materials in similar applications if processing difficulties of polyesters could be overcome.

It is possible to increase the melt strength of a polymer by lowering the melt temperature but, since the high shear rate viscosity is also increasing, eventually the temperature will drop to the point where melt fracture appears. Decreasing the temperature also increases the degree of shear thinning so it does make it possible to process articles of up to a certain size, but the improved degree of shear thinning is usually insufficient to enable the production of large articles.

It is also possible to increase the melt strength and degree of shear thinning by increasing the molecular weight and molecular weight distribution of the polyester through solid state polymerization. Again, however, the improvement in shear thinning obtained by this method is usually insufficient to allow the production of large articles. Furthermore any polyester that can be solid stated is crystallizable, whereby it can not be processed at a temperature lower than its melting point. Certain solid stated polymers may also exhibit a phenomenon referred to as "unmelts", wherein a portion of the solid stated pellets possess a very high melting point, or a very high viscosity whereby they do not disperse in the melt pool. The resulting pellet sized particles are easily observed in the parion and resultant bottle. These unmelts are an unacceptable visual defect. In order to eliminate unmelts, the material must be processed at higher temperatures, which often results in an unacceptable reduction in melt strength.

A linear polyester is defined as a polyester that is prepared from A-A and B-B monomers or A-B monomers or combinations of these with the correct stoichiometric balance. A-A monomers can represent dibasic acids such as terephthalic acid, isophthalic acid and B-B monomers can represent diols such as ethylene glycol and 1,4-cyclohexanedimethanol. An A-B monomer can represent p-hydroxybenzoic acid, etc. When the stoichiometry of these polymerizing systems is correct, linear high molecular weight polyesters are readily prepared. Diesters of the dicarboxylic acid can be used instead of the dicarboxylic acids and high molecular polyesters can be prepared by transesterification process.

It is possible to add a branching agent into the reactor so that the resulting polymer chain is no longer linear. Branching agents usually are defined by the number of functional groups attached and can take the form of an $A_3$ or $B_3$ molecule where $A_3$ is a tricarboxylic acid or tricarboxylic acid ester and $B_3$ is a triol. Also $A_2B$ and $AB_2$ monomers can be employed to affect branching where $A_2B$ represents a monomer with 2 acid functional groups and 1 alcohol and $AB_2$ represents a molecule of 1 acid functionality and 2 alcohol groups. Higher functionality branching groups can also be employed for this purpose including tetrafunctional groups, such as from pentaerythritol and phromellitic dianhydride. The science related to polyester branching is well known in the polyester art. Chain branching is one of the most common methods for improving the melt strength of a polymer, particularly polyesters. However, the use of branching agents can lead to unacceptable gel formation in the melt, especially if the branched material has been solid stated. A gel is nothing more than a point in the polyester where too much localized branching occurs, effectively creating a tightly interconnected network of chains that cannot be easily melted. This gel is present in the final molded/extruded part as an unacceptable visual defect. To minimize gelling, the branching agents are added at a low level with uniform dispersion throughout the reactor. Thus, a branched polyester is difficult to produce and the increase in melt strength is limited to the maximum amount of branching agent that can be added without gel formation.

Amorphous copolyesters comprising terephthalic acid (T) residues with different ratios of 1,4-cyclohexanedimethanol (CHDM) and ethylene glycol (EG) residues are well known in the plastics marketplace. As used herein, the abbreviation PETG is used for compositions wherein the diacid component contains or comprises terephthalic acid residues and the diol component comprises up to 50 mole percent CHDM residues with the remaining diol component being ethylene glycol residues. PCTG is used herein to refer to copolyesters wherein the diacid component comprises terephthalic acid residues and the diol component comprises greater than 50 mole percent CHDM residues with the remainder being ethylene glycol residues.

Neopentyl glycol (NPG, 2,2-dimethyl-propane-1,3-diol) is another common diol used in the preparation of polyesters. Similar to CHDM, NPG has been used in combination with EG and terephthalic acid to form useful amorphous copolyesters. However, the combination of NPG and CHDM as the sole glycol components of the copolyester has received minimal attention.

Several early references disclose polyesters containing both CHDM and NPG residues with terephthalic acid residues as the diacid compoent. Example 46 of U.S. Pat. No. 2,901,466 describes a copolyester prepared from CHDM and NPG residues that was solid stated to an IV of 1.06. The CHDM was described as being "75% trans". The copolyester was reported to have a crystalline melting point of 289–297° C. The exact composition of this polyester was not disclosed, but the melting point of this polymer is not very different from that of pure poly(1,4-cyclohexylene-dimethylene terephthalate) (PCT, Tm=293° C.).

U.S. Pat. No. 3,592,875 discloses polyester compositions that contain both NPG and CHDM residues with an added polyol present for branching. U.S. Pat. No. 3,592,876 discloses polyester compositions that contain both EG, CHDM and NPG residues with the level of NPG residues limited to up to 10 mole percent. U.S. Pat. No. 4,471,108 discloses low molecular weight polyesters, some of which contain CHDM and NPG residues but which also contain a multifunctional branching agent. U.S. Pat. No. 4,520,188 describes novel low molecular weight copolyesters with mixtures of aliphatic and aromatic diacid residues with both NPG and CHDM residues present.

U.S. Pat. No. 4,182,841 describes a composition containing between 80 and 70 mole percent ethylene glycol and between 20 and 30 mole percent neopentyl glycol that also contains a polyfunctional modifying material, i.e., a branching agent. Terephthalic acid is the only acid used in the compositions. CHDM was not mentioned. U.S. Pat. Nos. 5,523,382 and 5,442,036 describe a branched copolyester suitable for extrusion blow molding. The copolymer contains ethylene glycol (EG) residues in addition to 0.5 to 10 mole percent of CHDM residues and 3 to 10 mole percent diethylene glycol (DEG) residues. The diacid component comprises terephthalic acid residues with up to 40 mole percent isophthalic acid (IPA) or 2,6-naphthalenedicarboxylic acid (NDA) residues. The branching agent preferably consists of trimellitic acid or anhydride. NPG is not mentioned.

U.S. Pat. No. 4,983,711 describes a branched copolyester composed of EG and CHDM residues and consisting of from 0.05 to 1 mole percent of a tri-functional branching agent, preferably trimellitic acid or anhydride. Preferred levels of the branching agent are from 0.1 to 0.25 mole percent. This patent discloses CHDM residue levels of 25 to 75 mole percent and is concerned with extrusion blow molding applications. The prevention of melt fracture is not mentioned. NPG is not discussed. U.S. Pat. No. 5,376,735 describes a branched poly(ethylene terephthalate) modified with up to 3 mole percent IPA residues for use in extrusion blow molding applications. A number of branching agents are mentioned including TMA.

U.S. Pat. No. 5,235,027 describes a branched co-poly(ethylene terephtalate) for extrusion blow molding. The PET contains from 0.5 to 5 weight percent IPA residues, 0.7 to 2.0 weight percent DEG residues, 300–2500 ppm tri- or tetra-hydroxyalkane residues, 80–150 ppm Sb, phosphorous at least 25% by weight of the amount of Sb, red and blue toner (not exceeding 5 ppm), and various branching agents with pentaerythritol being preferred. NPG is not discussed.

U.S. Pat Nos. 4,234,708, 4,219,527 and 4,161,579 describe branched and end capped modified PET polyesters for extrusion blow molding. A variety of chain branching agents (from 0.025 to 1.5 mole percent) and 0.25 to 10 equivalents of a non-ionic chain terminator are described for controlling reaction conditions and preventing gelling. NPG is not discussed. U.S. Pat. No. 4,398,022 describes a high melt strength copolyester consisting of terephthalic acid and 1,12-dodecanedioic acid residues along with a diol component comprising CHDM residues. No branching agent was utilized. Japanese Patent Publication JP 3225982 B2 discloses amorphous copolyesters said to be useful in the formulation of coating compositions for steel sheet. The disclosed copolyesters comprise a diacid component comprising mixtures of aliphatic and aromatic acid residues and a diol component comprising NPG and CHDM residues.

SUMMARY OF THE INVENTION

In view of the state of the art described above, there is a need for shaped articles and extrusion blow molding processes which produce such shaped articles utilizing a linear polyester having improved processability for extrusion blow molding by simultaneously having a higher melt strength without gel formation and an increase in shear thinning. Accordingly, it is to the provision of such articles, processes and polyesters that the present invention is primarily directed. One embodiment of the present invention is a process for the manufacture of shaped articles by extrusion blow molding comprising the steps of:

(1) extruding a copolyester through a die to form a tube of molten copolyester;

(2) positioning a mold having the desired finished shape around the tube of molten copolyester; and (3) introducing a gas into the tube of molten copolyester, causing the extrudate to stretch and expand to fill the mold;

wherein the copolyester is a linear, copolyester having an inherent viscosity (IV) of at least about 0.7 dL/g measured at a temperature of 25° C. at 0.5 g/dL concentration in a solvent mixture of symmetric tetrachloroethane and phenol having a weight ratio of symmetric tetrachloroethane to phenol of 2:3 and comprising:

(i) a diacid component consisting essentially of about 90 to 100 mole percent terephthalic acid residues and 0 to about 10 mole percent isophthalic acid residues, naphthalenedicarboxylic acid residues, biphenyidicarboxylic acid residues or a combination of 2 or more of isophthalic, naphthalenedicarboxylic or biphenyidicarboxylic acid residues; and (ii)) a diol component consisting essentially of about 70 to 90 mole percent 1,4-cyclohexanedimethanol residues and about 30 to 10 mole percent neopentyl glycol residues;

wherein the copolyester comprises 100 mole percent diacid component and 100 mole percent diol component. The linear polyester chain consists essentially of the diacid and diol component defined above meaning the polyesters are devoid or essentially devoid of residues derived from monomers or reactants having three or more functional groups that typically are present in branched-chain polyesters. These copolyesters have been found to have unusually high melt strength and degree of shear thinning for a linear polyester. The significant shear thinning of these copolyesters make them particularly well suited for extrusion blow molding applications.

We have discovered that the above-defined linear copolyesters are crystallizable. As used herein, the term "crystallizable" means a copolyester that exhibits a substantial crystalline melting point when scanned by differential scanning calorimetry (DSC) at a rate of 20° C./minute. These crystallizable compositions are distinct from the amorphous compositions in that they can be can be solid stated. Solid stating is a process for increasing the IV of a polyester beyond what can be easily be produced by standard melt phase polymerization. It has been discovered that these solid stated, NPG-containing copolyesters shear thin to a much greater degree than similar linear solid stated polyesters that do not contain NPG. These solid stated NPG-containing polyesters have rheological characteristics that are particularly well suited for the extrusion blow molding of large articles.

Another embodiment of the present invention is an extrusion blow molded article produced from a linear copolyester having an inherent viscosity (IV) of at least about 0.7 dL/g measured at a temperature of 25° C. at 0.5 g/dL concentration in a solvent mixture of symmetric tetrachloroethane and phenol having a weight ratio of symmetric tetrachloroethane to phenol of 2:3 and comprising:

(i) a diacid component consisting essentially of about 90 to 100 mole percent terephthalic acid residues and 0 to about 10 mole percent isophthalic acid residues, naphthalenedicarboxylic acid residues, biphenyldicarboxylic acid residues or a combination of 2 or more of isophthalic, naphthalenedicarboxylic or biphenyidicarboxylic acid residues; and (ii) a diol component consisting essentially of about 70 to 90 mole percent 1,4-cyclohexanedimethanol residues and about 30 to 10 mole percent neopentyl glycol residues;

wherein the copolyester comprises 100 mole percent diacid component and 100 mole percent diol component.

DETAILED DESCRIPTION OF THE INVENTION

In the first step of the extrusion blow molding process of the present invention, the copolyester is extruded through a die to form a tube of molten polyester. This step may be carried out using a conventional extruder wherein the copolyester is heated to a temperature of about 250 to 300° C. to form a melt of the copolyester. The melt then is extruded through a die, typically in a downward direction, to form a tube of melted copolyester. The width of the tube typically is in the range of about 50 to 200 mm.

In the second step of the extrusion blow molding process, a mold having the desired finished shape is clamped or positioned around the tube of molten copolyester that is suspended or hanging from the die. In the third step of the process, a gas such as air or nitrogen is fed into the tube of molten copolyester, causing the extrudate to stretch and expand to fill the mold. The mold and shaped article contained therein are cooled, e.g., to a temperature of about 20 to 50° C. and then the article is removed from the mold. The extrusion blow molding process of the present invention is especially useful for the manufacture of large containers such as large bottles or carboys for the packaging of liquids such as water. Because of the combination of desirable properties possessed by the copolyesters employed in the present invention, large containers, e.g., containers having a capacity of from about 2 to 50 liters, can be produced by our novel process.

The linear copolyesters utilized in the present invention may be prepared by conventional polymerization processes known in the art, such as disclosed by U.S. Pat. Nos. 4,093,603 and 5,681,918, the disclosures of which are herein incorporated by reference. Examples of polycondensation processes useful in preparing our novel copolyesters include melt phase processes conducted with the introduction of an inert gas stream, such as nitrogen, to shift the equilibrium and advance to high molecular weight or the more conventional vacuum melt phase polycondensations, at temperatures ranging from about 240 to about 300° C. or higher which are practiced commercially. The diacid residues of the copolyesters may be derived from either the dicarboxylic acids or ester-producing equivalents thereof such as esters, e.g., dimethyl terephthalate and dimethyl isophthalate, or acid halides, e.g. acid chlorides. Although not required, conventional additives may be added to the copolyesters of the invention in typical amounts. Such additives include pigments, colorants, stabilizers, antioxidants, extrusion aids, slip agents, carbon black, flame retardants and mixtures thereof.

The polymerization reaction may be carried out in the presence of one or more conventional polymerization catalysts. Typical catalysts or catalyst systems for polyester condensation are well-known in the art. Suitable catalysts are disclosed, for Example, in U.S. Pat Nos. 4,025,492, 4,136,089, 4,176,224, 4,238,593, and 4,208,527. Typical catalyst useful in polyester-forming processes also are described by R. E. Wilfong, Journal of Polymer Science, 54, 385 (1961). Preferred catalyst systems include Ti, Ti/P, Mn/Ti/Co/P, Mn/Ti/P, Zn/Ti/Co/P, Zn/Al. When cobalt is not used in the polycondensation, the use of polymerizable toners may be required to control the color of these copolyesters so that they are suitable for the intended applications where color may be an important property. In addition to the catalysts and toners, other additives, such as antioxidants, dyes, etc. may be used in the copolyesterifications.

Solid-state polymerization is a process well known in the art as described, for example, in U.S. Pat. No. 4,064,112. In this process, amorphous precursor pellets that have been prepared by melt phase polymerization are first crystallized at a temperature 10°–100° C. below their melt temperature and then further held at a temperature of at least 10° C. below their melt temperature for a sufficiently long time, e.g., 2–40 hours, in the presence of either vacuum or a flow of dry nitrogen to increase their IV. These high temperatures are required to allow polymerization to proceed at a relatively rapid and economical rate. At these high temperatures, amorphous pellets would soften and fuse together into a highly viscous block. In contrast, crystalline pellets will not stick together at these temperatures. Thus, solid state polymerization can only be performed on crystallized pellets. Generally when molding grade pellets are produced, either a batch or continuous process is used. In a batch process, pellets are added to a large container heated according to the two stage process described above. The container is continuously rotated to provide uniform heating of the pellets, and to prevent sticking of the pellets to the container walls during the initial crystallization. In a continuous process, the pellets first drop by gravity into a crystallizer unit, and then flow by gravity through a large heated container which builds the IV. Continuous processes are preferred for commercial operations for reasons of economics. Normally, in solid stating pellets, particles of regular or irregular shape may be used. The particles may be of various shapes and sizes such as spherical, cubical, irregular such as described in U.S. Pat. No. 5,145,742, cylindrical, or as described in U.S. Pat. No. 4,064,112. "Particles" also includes shapes which are generally flat.

Solid stating normally is accomplished by subjecting the copolyester particles to a temperature of about 140° C. below the melting point to about 2° C. below the melting point of the polyester, preferably about 180° C. below the melting point to about 10C° C. below the melting point of the polyester. The time of solid stating can vary over a wide range (about 1 to 100 hours) according to temperature to obtain the desired IV, but with the higher temperatures, usually about 10 to about 60 hours is sufficient to obtain the desired IV or molecular weight. During this period of solid stating, it is conventional to flow a stream of inert gas through the pellets to aid in temperature control of the polyester pellets and to carry away reaction gases such as ethylene glycol and acetaldehyde. Nitrogen is especially suitable for use as the inert gas because it contributes to the overall economy of the process. Preferably, the inert gas is recycled for economic reasons. Other inert gases which may be used include helium, argon, hydrogen, and mixtures thereof. It should be understood that the inert gas may contain some air or oxygen-depleted air.

It is often observed in solid stating processes that the rate of IV increase may slow considerably with time. Thus, the maximum IV that can be obtained may be limited by the initial IV of the precursor copolyester material. For this reason, the IV of the copolyester precursor pellets prior to introduction into the solid stating process typically is between 0.4 and 0.9, preferably between 0.6 and 0.85, most preferably between 0.65 and 0.8.

The diacid component of the copolyesters employed in the present invention preferably consists essentially at least 95 mole percent, or more preferably 100 mole percent, terephthalic acid residues. In a preferred embodiment, wherein the diacid component of the copolyester consists essentially of terephthalic acid residues, the IV of the solid stated copolyester ranges from about 0.9 to about 1.2 dL/g.

The second embodiment of our invention are shaped articles prepared from the copolyesters described above. Examples of typical shaped articles include containers, water cooler cabinets, toys, cabinetry, medical devices, and appliance parts. The shaped articles provided by the present invention preferably are bottles, especially bottles having a capacity of about 2 to 50 liters, prepared by the extrusion blow molding process described herein.

EXAMPLES

The copolyesters provided by the present invention and the preparation thereof are further illustrated by the following examples. The inherent viscosities were measured at a temperature of 25° C. at 0.5 g/dL concentration in a solvent mixture of symmetric tetrachloroethane and phenol having a weight ratio of symmetric tetrachloroethane to phenol of 2:3. The first cycle melting temperature (Tm1) was determined according to DSC at a heating rate of 20° C./minute to a temperature of 280–300° C. The $2^{nd}$ cycle glass transition temperatures (Tg), crystallization temperature (Tch) and melt temperatures (Tm2) were determined according to DSC at a heating rate of 20° C./minute to a temperature of 280–300° C., quenching in liquid nitrogen to 0° C., and then rerunning the sample. Final copolyester compositions were determined by proton NMR analysis on a 600 MHz JEOL instrument. The melt viscosity was determined by a Rheometrics Dynamic Analyzer (RDA II) with 25 mm diameter parallel plates, 1 mm gap and 10% strain at the temperatures indicated. The samples were dried at 60° C. for 24 hours in a vacuum oven before the frequency sweep test. Bottles were prepared using a 80 mm Bekum H-121 continuous extrusion blow molding machine fitted with a barrier screw containing a Maddock mixing section. The materials were dried for 12 hours at 121° C. (250° F.) prior to extrusion. The extruder was run at 16 revolutions per minute (RPM). The materials were extruded into water bottles having a volume of 3.785 liters (1 U.S. gallon), using a 100 mm die. The bottles weighed between 145 and 160 grams. Melt Strength also was measured by recording the time elapsed between when the parison emerged from the die to when it reached a point 20 inches below the head. The parison was cut at this time and weighed. The "melt strength" was recorded as the product of the time and the weight of the parison drop, in units of gram-seconds.

Example 1

A copolyester comprising a diacid component consisting of 100 mole percent terephthalic acid residues and a diol component consisting of 83 mole percent CHDM residues and 17 mole percent NPG residues (hereinafter referenced as 100T/83CHDM/17NPG) was melt-phase polymerized in a 65 gallon (245 liter) stainless steel batch reactor with intermeshing spiral agitators. To the reactor was added 39.64 kg (87.39 pounds, 204.5 moles) of dimethyl terephthalate, 11.48 kg (25.30 pounds, 110.4 moles) of neopentyl glycol (NPG), 28.25 kg (62.27 pounds, 196.3 moles) of 1,4-cyclohexanedimethanol (CHDM) and 112.56 grams of a butanol solution containing the titanium catalyst. The reactor was heated to 200° C. and held for 2 hours with agitation at 25 RPM. The temperature was increased to 260° C. and held for 30 minutes. The temperature was increased to 270° C. and the pressure was reduced at a rate of 13 torr per minute to full vacuum. After the vacuum reached <4000 microns (<4 torr), these conditions were held for 1 hour and 15 minutes at 25 RPM. The RPM was reduced to 15 RPM and the conditions held to a wattmeter peak. The pressure was increased to atmospheric with nitrogen and the copolymer was pelletized. The copolymer had a melt phase inherent viscosity (IV) of 0.758, color values of L*=68.50, a*=−0.30, b*=6.47, and a composition by Nuclear Magnetic Resonance, (NMR) of 100T/83CHDM17NPG. This polymer then was crystallized at 150° C. for 2 hours and then solid state polymerized in a static bed reactor with a nitrogen purge at 230° C. for 24 hours. The IV of the solid stated material was 1.11 dL/g. The polymer had a second cycle DSC glass transition temperature of 92.5° C., a crystallization on heating (Tch) of 191.7° C. (2.59 cal/g) and a melting point of 251.0° C. (3.08 cal/g). The first cycle melting point was 262.3° C. (10.01 cal/g). When measured at a temperature of 270° C., the copolyester has a melt viscosity of 134880 poise at 1 radian per second and a melt viscosity of 21162 poise at 100 radian per second. The ratio of melt viscosity at 1 radian per second to the melt viscosity at 100 radian per second is 6.37. Surprisingly, the copolyester of Example 1 demonstrates a shear thinning behavior that is superior to any of the other solid stated copolyesters. Indeed, the shear thinning behavior of the Example 1 copolyester is superior to even the branched copolyester described in Comparative Example 2. The melt strength of the copolyester of Example 1 is much higher than any of the other samples, even when examined under conditions that produce approximately 23,000 poise viscosity at 100 radian/second (the onset of melt fracture). Bottles were prepared at 260° C. (500° F.) barrel and head set temperatures. The melt temperature was measured to be 282° C. (539° F.). At these conditions, the material had excellent melt strength and the resulting bottles contained no unmelts or gels. The "melt strength" measured at this temperature was 4775 gm-sec.

The following comparative examples provide melt viscosity data for a number of copolyesters which are not within the scope of the present invention. These samples were prepared using the same general procedure as described in Example 1.

Comparative Example 1

A copolyester comprising a diacid component consisting of terephthalic acid residues and a diol component consisting of 69 mole percent EG residues and 31 mole percent CHDM residues having an IV of 0.74 dL/g was prepared by melt phase polymerization. It was not solid stated. The polymer has a melt viscosity, measured at 210° C., of 56396 poise at 1 radian per second and 21728 poise at 100 radian per second. The ratio of melt viscosity at 1 radian per second to the melt viscosity at 100 radian per second is 2.60. At this temperature, the viscosity at 1 radian/second is sufficiently high to give the material marginal melt strength. However, the copolyester can not be processed at lower temperatures, as the viscosity at 100 radian/second has increased to a limiting value. Experience with one particular but typical set of tooling has shown that if the viscosity becomes greater than approximately 23,000 at 100 radian/second, then the material will experience melt fracture during extrusion blow molding. The melt strength of this material at this temperature is sufficient to blow smaller bottles, but is insufficient to produce large bottles.

Comparative Example 2

A copolyester comprising a diacid component consisting of terephthalic acid residues and a diol component consisting of 69 mole percent EG residues and 31 mole percent CHDM residues and 0.18 mole percent trimelitic anhydrice residues having an IV of 0.74 dL/g was prepared by melt phase polymerization. It was not solid stated. This polymer has a melt viscosity, measured at 217° C., of 99377 poise at 1 radian per second and 23232 poise at 100 radian per second. The ratio of melt viscosity at 1 radian per second to the melt viscosity at 100 radian per second is 4.28. This lower temperature represents the onset of melt fracture (relative to the viscosity at 100 radian/second). However, at this temperature, the melt strength of this material is almost twice the melt strength of the polyester in Comparative Example 2. Thus, the bottle size that can be produced with this material is much larger than can be produced from the copolyester of Comparative Example 2. However, this sample is branched.

Comparative Example 3

A copolyester comprising a diacid component consisting of terephthalic acid residues and a diol component consisting of 97 mole percent EG residues and 3 mole percent CHDM residues was prepared and solid stated to an IV of 0.98 dL/g. The copolyester has a melt viscosity, measured at 265° C., of 72000 poise at 1 radian per second and 23000 poise at 100 radian per second. The ratio of melt viscosity at 1 radian per second to the melt viscosity at 100 radian per second is 3.11.

Comparative Example 4

A copolyester comprising a diacid component consisting of terephthalic acid residues and a diol component consisting of 19 mole percent EG residues and 81 mole percent CHDM residues having an IV of 0.75 dL/g was prepared by melt phase polymerization. This polymer has a melting point of 250° C. and a melt viscosity, measured at 270° C., of 9166 poise at 1 radian per second and 6842 poise at 100 radian per second. The ratio of melt viscosity at 1 radian per second to the melt viscosity at 100 radian per second is 1.34. This polymer lacks sufficient melt strength to be processed into large bottles, and can not be processed at a lower temperature, as it will crystallize in the extruder.

Comparative Example 5

A copolyester comprising a diacid component consisting of 74 mole percent terephthalic acid residues and 26 mole percent isophthalic acid residues and a diol component consisting of 100 mole percent CHDM residues having an IV of 0.72 dL/g was prepared by melt phase polymerization. This polymer has a melting point of 245° C. and a melt viscosity, measured at 270° C., of 5042 poise at 1 radian per second and 4274 poise at 100 radian per second. The ratio of melt viscosity at 1 radian per second to the melt viscosity at 100 radian per second is 1.18. This polymer lacks sufficient melt strength to be processed into large bottles, and can not be processed at a lower temperature, as it will crystallize in the extruder.

Comparative Example 6

The copolyester prepared in Comparative Example 4 was solid stated to an IV of 1.03 dL/g. This polymer has a melt viscosity, measured at 270° C., of 50482 poise at 1 radian per second and 21434 poise at 100 radian per second. The ratio of melt viscosity at 1 radian per second to the melt viscosity at 100 radian per second is 2.36. Bottles were prepared at 260° C. (500° F.) barrel and head set temperatures. The melt temperature was measured to be 283° C. (541° F.). At these conditions, the material had marginal melt strength and the resulting bottles contained many unmelts. The "melt strength" measured at this temperature was 1830 gm-sec. Raising the temperature removed the unmelts, but the parison lacked sufficient melt strength to make a bottle.

Comparative Example 7

The copolyester prepared in Comparative Example 5 was solid stated to an IV of 1.07. This polymer has a melt viscosity, measured at 270° C., of 49321 poise at 1 radian per second and 23091 poise at 100 radian per second. The ratio of melt viscosity at 1 radian per second to the melt viscosity at 100 radian per second is 2.14. Bottles were prepared at 260° C. (500° F.) barrel and head set temperatures The melt temperature was measured to be 283° C. (542° F.). At these conditions, the material had marginal melt strength and the resulting bottles contained many unmelts. The "melt strength" measured at this temperature was 2000 gm-sec. Raising the temperature removed the unmelts, but the parison lacked sufficient melt strength to make a bottle. This melt strength is insufficient to make large bottles.

The invention has been described in detail with particular reference to preferred embodiments thereof, but it will be understood that variations and modifications can be effected within the spirit and scope of the invention.

We claim:

1. Process for the manufacture of shaped articles by extrusion blow molding comprising the steps of:
   (1) extruding a copolyester through a die to form a tube of molten copolyester;
   (2) positioning a mold having the desired finished shape around the tube of molten copolyester; and
   (3) introducing a gas into the tube of molten copolyester, causing the extrudate to stretch and expand to fill the mold;
   wherein the copolyester is a linear, copolyester having an inherent viscosity (IV) of at least about 0.7 dL/g measured at a temperature of 25° C. at 0.5 g/dL concentration in a solvent mixture of symmetric tetrachloroethane and phenol having a weight ratio of symmetric tetrachloroethane to phenol of 2:3 and comprising:
   (1) a diacid component consisting essentially of about 90 to 100 mole percent terephthalic acid residues and 0 to about 10 mole percent isophthalic acid residues, naphthalenedicarboxylic acid residues, biphenyldicarboxylic acid residues or a combination of 2 or more of isophthalic, naphthalenedicarboxylic or biphenyldicarboxylic acid residues; and
   (2) a diol component consisting essentially of about 70 to 90 mole percent 1,4-cyclohexanedimethanol residues and about 30 to 10 mole percent neopentyl glycol residues;
   wherein the copolyester comprises 100 mole percent diacid component and 100 mole percent diol component.

2. The process of claim 1 wherein the copolyester comprises a diacid component consisting essentially of at least 95 mole percent terephthalic acid residues.

3. The process of claim 1 wherein the copolyester comprises a diacid component consisting essentially of 100 mole percent terephthalic acid residues.

4. Process according to claim 3 wherein the copolyester has an inherent viscosity (IV) of about 0.9 to 1.2 dL/g.

5. Process according to claim 4 wherein the copolyester is manufactured by a solid state polymerization process.

6. Process for the manufacture of a container having a volume of about 2 to 50 liters by extrusion blow molding comprising the steps of:
   (1) extruding a copolyester through a die to form a tube of molten copolyester;
   (2) positioning a mold having the desired finished shape of the container around the tube of molten copolyester; and
   (3) introducing a gas into the tube of molten copolyester, causing the extrudate to stretch and expand to fill the mold;

wherein the copolyester is a linear, copolyester having an inherent viscosity (IV) of at least about 0.9 to 1.2 dL/g measured at a temperature of 25° C. at 0.5 g/dL concentration in a solvent mixture of symmetric tetrachloroethane and phenol having a weight ratio of symmetric tetrachloroethane to phenol of 2:3 and comprising:
   (1) a diacid component consisting essentially of terephthalic acid residues; and
   (2) a diol component consisting essentially of about 70 to 90 mole percent 1,4-cyclohexanedimethanol residues and about 30 to 10 mole percent neopentyl glycol residues;

wherein the copolyester comprises 100 mole percent diacid component and 100 mole percent diol component.

7. Process according to claim 6 wherein the molten copolyester has a temperature of about 250 to 300° C.

8. An extrusion blow molded article comprising a linear copolyester having an inherent viscosity (IV) of at least about 0.7 dL/g measured at a temperature of 25° C. at 0.5 g/dL concentration in a solvent mixture of symmetric tetrachloroethane and phenol having a weight ratio of symmetric tetrachloroethane to phenol of 2:3 and comprising:
   (1) a diacid component consisting essentially of 90 to 100 mole percent terephthalic acid residues and 0 to about 10 mole percent isophthalic acid residues, naphthalenedicarboxylic acid residues, biphenyidicarboxylic acid residues or a combination of 2 or more of isophthalic, naphthalenedicarboxylic or biphenyldicarboxylic acid residues; and
   (2) a diol component consisting essentially of about 70 to 90 mole percent 1,4-cyclohexanedimethanol residues and about 30 to 10 mole percent neopentyl glycol residues;

wherein the copolyester comprises 100 mole percent diacid component and 100 mole percent diol component.

9. An extrusion blow molded article according to claim 8 wherein the copolyester comprises a diacid component consisting essentially of at least 95 mole percent terephthalic acid residues.

10. An extrusion blow molded article according to claim 8 wherein the copolyester comprises a diacid component consisting essentially of 100 mole percent terephthalic acid residues.

11. An extrusion blow molded article according to claim 10 wherein the copolyester has an inherent viscosity (IV) of about 0.9 to 1.2 dL/g.

12. An extrusion blow molded article according to claim 8 wherein the copolyester comprises a diacid component consisting essentially of 100 mole percent terephthalic acid residues; the copolyester has an inherent viscosity (IV) of about 0.9 to 1.2 dL/g; and the shaped article is a bottle having a volume of about 2 to 50 liters.

* * * * *